April 25, 1933.  L. HIZSNAY ET AL  1,905,227

COOKING UTENSIL

Filed April 25, 1930

INVENTORS
Leopoldine Hizsnay
Rudolf Amann
by Roberts, Cushman & Woodbury
their Attorneys Patented Apr. 25, 1933

1,905,227

UNITED STATES PATENT OFFICE

LEOPOLDINE HIZSNAY, OF ITHACA, NEW YORK, AND RUDOLF AMANN, OF BROOKLINE, MASSACHUSETTS

COOKING UTENSIL

Application filed April 25, 1930. Serial No. 447,256.

For the making of certain pastries, particularly the kind serving as container of various fillings, it is necessary to have a form or shell over which the semi-liquid material—meringue, dough, etc. of which the pastry is made can be applied. This utensil has to permit easy handling, thorough, but uniform baking or drying, and it must be cheap, durable, and easily cleaned.

It is therefore, the main object of the present invention to provide a cooking utensil for making articles of dough, meringue, or similar material in a convenient and efficient way; another object is to provide such a utensil which permits the even, thorough and quick preparation of such articles; a further object is to provide such a utensil which can be easily and cheaply manufactured. Other objects will appear from the following description explaining a specific embodiment of the invention which is shown on the accompanying drawing in which Fig. 1 is a view of the blank of which the utensil according to the invention may conveniently be made, Fig. 2 is an isometric view of the utensil, and Fig. 3 is a sectional view along lines 3—3 of Fig. 2.

Figure 1:
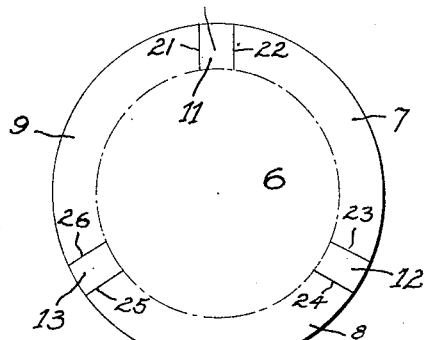
Figure 2:
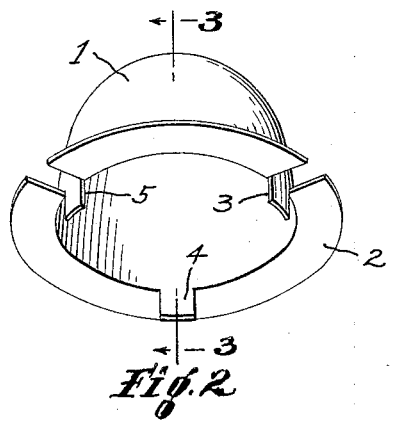
Figure 3:
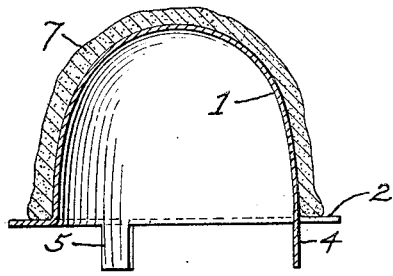

Referring now especially to Figures 2 and 3, 1 is the main body or shell of the utensil, which is for the sake of simplicity shown as a half ellipsoid, although it may have any desired and convenient shape. 2 is a rim surrounding the lower edge of the shell, which may or may not be turned up to any desired extent and which serves for supporting the dough 7 applied to the utensil. 3, 4, 5 are feet holding shell and rim above the supporting surface which will in most instances be heated, so that the dough or rim cannot come into direct contact with this heated surface. The feet also secure circulation of air around the whole shell and the rim and therefore provide even and thorough heating of the pastry from both sides. Fig. 1 shows a blank of sheet metal of which the utensil may be most conveniently made by punching and stamping, although it can be manufactured of any suitable material in any suitable way. The blank here shown is circular and has 6 cuts arranged in 3 pairs, corresponding to the 3 feet as shown in Figs. 2 and 3. 6 is the center part of which the shell is pressed. The shape of the rim parts 7, 8, 9, is substantially preserved whereas parts 10, 11, 12 are bent downward to form the feet.

It will be apparent to anyone skilled in the art that the utensil may be formed in many different ways and of a large variety of materials as e. g. from fire-proof china or enameled ware.

We claim,

A cooking utensil comprising a shell of the shape of an inverted vessel, a rim surrounding the edge of said shell and feet supporting said shell and said rim, said shell and said feet being integrally stamped of a blank of sheet material.

Signed by LEOPOLDINE HIZSNAY at Ithaca, N. Y., this 22d day of April, 1930 and by RUDOLF AMANN at Boston, Mass., this 21st day of April, 1930.

LEOPOLDINE HIZSNAY.
RUDOLF AMANN.